Dec. 28, 1965  C. H. MERCER ETAL  3,226,113
COLLAPSIBLE WHEEL STRUCTURE FOR ROTARY AMUSEMENT DEVICES
Filed Nov. 19, 1963  2 Sheets-Sheet 1

INVENTORS
CHARLES H. MERCER
GLENN A. WOLFORD
BY DAVID E. COPELAND

*Francis J. Klempay*
ATTORNEY

Dec. 28, 1965    C. H. MERCER ETAL    3,226,113
COLLAPSIBLE WHEEL STRUCTURE FOR ROTARY AMUSEMENT DEVICES
Filed Nov. 19, 1963    2 Sheets-Sheet 2

INVENTORS
CHARLES H. MERCER
GLENN A. WOLFORD
BY DAVID E. COPELAND

Francis J. Klempay
ATTORNEY

United States Patent Office 3,226,113
Patented Dec. 28, 1965

3,226,113
COLLAPSIBLE WHEEL STRUCTURE FOR ROTARY
AMUSEMENT DEVICES
Charles H. Mercer, Box 105, R.D. 3, Canfield, Ohio;
Glenn A. Wolford, R.D. 3, Canfield, Ohio; and David
E. Copeland, 4230 Woodmere Drive, Austintown, Ohio
Filed Nov. 19, 1963, Ser. No. 324,805
2 Claims. (Cl. 272—29)

This invention relate to a collapsible wheel structure for a rotary amusement device, and more particularly to an improved hub structure for such wheels whereby such wheels may be readily collapsed and folded for transportation. The invention is particularly applicable in the design and construction of amusement devices such as Ferris wheels and carrousels used at carnivals and fairs for short stands, requiring the equipment to be repeatedly collapsed and packed for shipment from one location to another. Much of this equipment when set up for operative use is of large size whereas highway load regulations strictly limit the maximum dimensions of a packaged load using the highway. This requires that large components such as wheels be broken down and folded for shipment, and it is the primary object of the present invention to provide an improved wheel and hub construction which enables this to be accomplished in a wholly practical manner.

Another object of the invention is the provision of an improved collapsible and foldable wheel for outdoor amusement devices which possesses greater strength and safety in use than arrangements heretofore proposed for similar purposes. A further object of the invention is the simplification of the mechanical components required in carrying out the collapsible concept whereby the equipment is more economical to manufacture and is lighter in over-all weight. Also, the invention seeks to provide greater safety to the operator in setting up and dismantling the equipment.

The above and other objects and advantages of the invention will become apparent upon consideration of the following specification and the accompanying drawing wherein there is disclosed a preferred embodiment of the invention.

Figure 1:
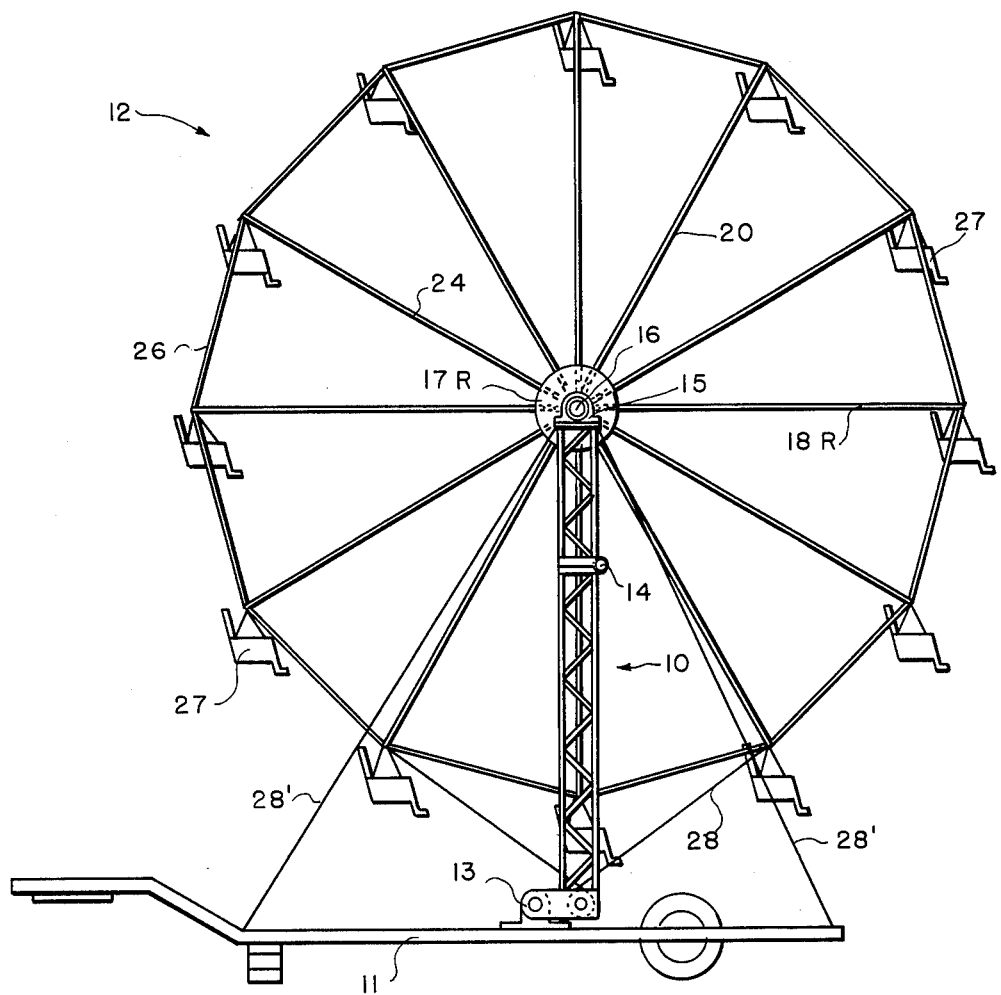
FIGURE 1 is a side elevation of an assembled Ferris wheel constructed in accordance with the principles of the present invention.

In accordance with more or less usual practice, the illustrated embodiment of the invention comprises a pair of spaced towers 10 mounted on a lowboy semi-trailer 11 and rotatably supporting a wheel structure indicated generally by reference numeral 12. The lower ends of the towers 10 are hinged to the trailer at 13 and the towers themselves are each made in two sections hinged together at 14 so that the towers may be folded and lowered down onto the trailer 11 for transport. The present invention is, however, only concerned with the structure of the wheel 12 and the same will now be described.

At the top of each of the towers 10 is a pillow block 15 for journaling a heavy transverse wheel shaft 16. Rigidly welded to opposite end portions of the shaft 16 but inwardly of and adjacent to the journal blocks 15 are the disks 17L and 17R which mount one half of the total number of the spokes of the wheel 12 on their inner faces. Two of these spokes as shown at 18L and 18R are each rigidly connected to the disks 17L and 17R by a pair of radially spaced rivets or bolts shown schematically at 19. Five other spokes such as shown at 20 are pivotally connected at their inner ends to each of the disks 17L and 17R, and the arrangement is such that when all these spokes are unrestrained at their radially outward ends the various spokes 20, for example, may be folded in overlying relation onto the spoke 18R thereby making a compact assembly when the equipment is collapsed for transportation.

Pivotally and slideably mounted on the shaft 16 immediately inward of the disk 17 and the spokes carried thereby is a second pair of disks 21L and 21R to which is connected the radially inner ends of the other half of the total number of spokes making up the wheel assembly. Again, two of such other spokes as shown at 22L and 22R are rigidly connected to the disks 21 by means of a pair of radially spaced bolts or rivets shown schematically at 23. The other spokes of this half of the wheel, as shown at 24, are pivotally connected at their radially inward ends to the disks 21 so that these other spokes may be folded down against the spokes 22L and 22R to provide a compact package of this half of the wheel.

Figure 2:
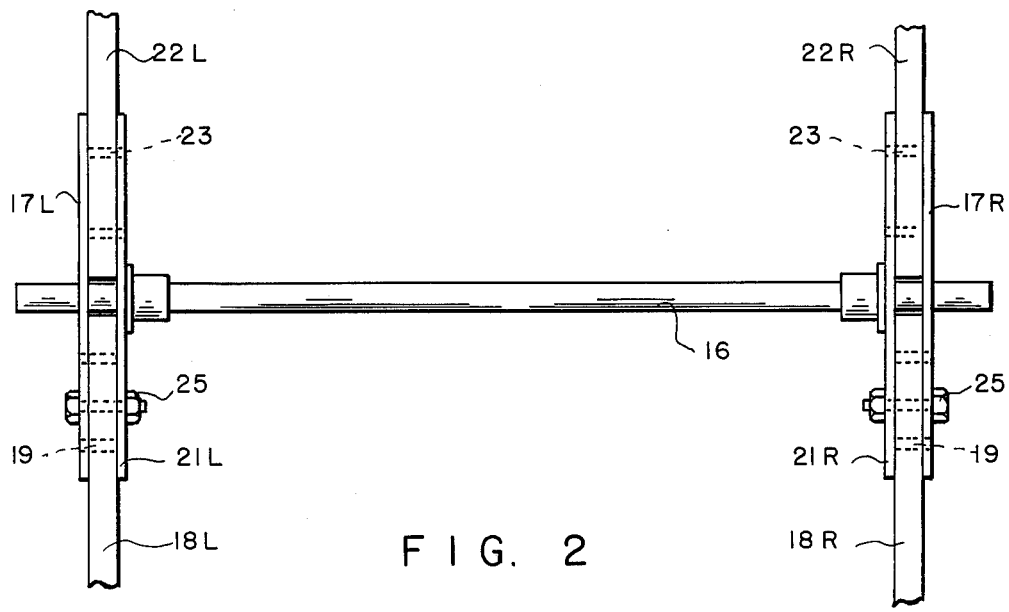
FIGURE 2 is a fragmentary elevation of the axle and hub construction utilized in the assembly of FIGURE 1, the view showing the hub sections in operative relative positions.
Figure 3:
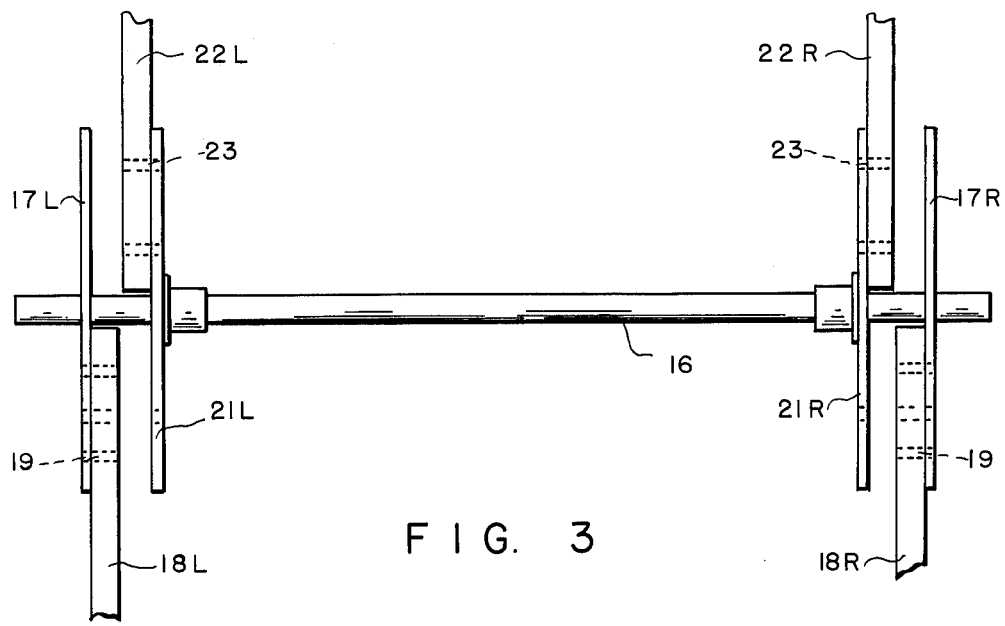
FIGURE 3 is a view similar to FIGURE 2 but showing the hub sections disengaged preparatory to the folding and gathering of the spokes of the wheel for shipment.

As shown in FIGURES 2 and 3, the spokes 22L, 22R and 24 which constitute one half of the wheel and which are attached to the disks 21L and 21R lie in the same plane as do the spokes 18L, 18R and 20 which are attached to the disks 17L and 17R. A pair of heavy bolts 25 or other suitable removable fastening means, is employed to lock the parts in proper relative positions to prohibit spreading of the two disks at either end of the shaft 16, and to insure that the inner disks 21L and 21R are properly related angularly to the outer disk for proper circumferential spacing of the spokes.

Also, when the wheel 12 is assembled for operation the radially outward ends of the various spokes on either side of the wheel are interconnected by rim links 26 which are readily removable to facilitate collapsing of the wheel structure. Each transversely opposite pair of spokes are, of course, interconnected by the frame of a swinging seat 27, and these seats with their component frames are also readily removable when the Ferris wheel structure is to be collapsed for transport. While not a part of this invention, the assembled wheel structure is arranged to be rotated by an endless drive rope 28, and the towers 10 are stabilized by guy ropes 28'.

When it is desired to collapse the wheel structure, the seats 27 are first removed and with the aid of a suitable temporary rigging rope, not shown, the two halves of the wheel assembly are temporarily retained in circumferential continuity to permit those rim links 26 which interconnect the two halves to be removed. This also permits the bolts 25 to be removed. The inner hub disks 21L and 21R are now withdrawn inwardly to position shown in FIGURE 3 by manual effort or by suitable electric, hydraulic or mechanical means, not shown herein. Assuming that the wheel is stopped with the spokes 18L and 18R extending vertically downward at which time the spokes 22L and 22R project upwardly the wheel segments which include the latter spokes may now be lowered with a rotative motion about the shaft 16 into positions whereby the spokes 22L and 22R are also suspended in vertical relation from the shaft 16. Thereafter it is a simple task to remove the remaining rim links to fold the various pivotally connected spokes against the spokes 18L, 18R, 22L and 22R. The resulting package is particularly compact due to the transverse nestling of the spokes of the two opposite halves of the wheel and when this package is laid down onto the bed of the trailer 11 it is well below the permissible load height limits specified for highway transport. Such laying down is accomplished by power rigging, not particulaly a part of the present invention and thus not shown but carried on the trailer 11, which first rotates the upper sections of the towers 10 rearwardly about pivots 14 to deposit the lower end of the depending spoke package onto the rear portion of the trailer 11. Thereafter the lower sections of the towers 10 are pivoted forwardly to jack-knife the sections of the tower and lower the whole mass of the spoke package horizontally onto the trailer.

While we have specifically illustrated our invention as applied to a portable Ferris wheel it should be understood that the basic principle thereof, which is the slip-hub arrangement, is equally applicable to other types of rotary amusement devices such as carrousels. In these latter devices there is usually a large horizontal wheel to support an annular platform and, again, this wheel may be so constructed that separate spoke sections are connected to separate hub sections which have relative actual sliding motion in a vertical direction on a vertical shaft so that the spoke segments may be nested vertically and the spokes of each segment swung around into close side-by-side relation with a master spoke of each segment to thereby provide a compact package for transport.

Since many changes may be made in the embodiments of our invention and since the invention is applicable to various specific uses, reference should be made to the appended claims in determining the scope of the invention.

We claim:

1. In a portable amusement device of the kind having a large spoked wheel for the support and movement of patrons, the combination of a shaft, a first hub disk mounted on said shaft, a plurality of radially outward extending spokes secured at their inner ends to said first disk and constituting but one segment of the circumferential extent of the wheel, a second hub disk mounted on said shaft in side-by-side relation to said first hub disk and slideable on said shaft toward and away from said first disk, means to detachably secure said disks together and to restrain relative rotation therebetween, and a second group of radially outward extending spokes secured at their inner ends to said second disk and constituting another segment of the circumferential extent of the wheel, the arrangement being such that upon detachment of said disks from each other and separation thereof said disks may be rotated relative to each other and the spokes of said second group brought into laterally nested relation with the first mentioned plurality of spokes.

2. Apparatus according to claim 1 further characterized in that an intermediate one of said first mentioned plurality of spokes is rigidly connected with said first hub to move therewith as a unitary assembly, the other spokes of said plurality of spokes being pivotally connected to said first hub whereby they may be brought into generally parallel relation with said rigidly secured spoke, and an intermediate one of said second group of spokes being rigidly secured to said second disk while the other spokes of said group are pivotally connected to said disk and thus capable of being brought into generally parallel relation with the intermediate spoke rigidly attached to said second disk.

References Cited by the Examiner

UNITED STATES PATENTS 3,002,753    10/1961    Garbrick _____ 272—29

RICHARD C. PINKHAM, *Primary Examiner.*